United States Patent
Krstulich

(10) Patent No.: US 7,693,527 B2
(45) Date of Patent: Apr. 6, 2010

(54) RESTRICTED FREQUENCY BAND REMOTE DEVICE COMMUNICATION AUTHORIZATION BY GEOGRAPHIC LOCATION

(75) Inventor: Zlatko Krstulich, Ottawa (CA)

(73) Assignee: Alcatel Lucent, Paris (FR)

( * ) Notice: Subject to any disclaimer, the term of this patent is extended or adjusted under 35 U.S.C. 154(b) by 838 days.

(21) Appl. No.: 11/495,617

(22) Filed: Jul. 31, 2006

(65) Prior Publication Data

US 2008/0026767 A1 Jan. 31, 2008

(51) Int. Cl.
*H04W 72/00* (2009.01)

(52) U.S. Cl. ............... 455/452.2; 455/452.1; 455/456.1

(58) Field of Classification Search ............. 455/452.1, 455/452.2, 456.1
See application file for complete search history.

(56) References Cited

U.S. PATENT DOCUMENTS

| | | | | |
|---|---|---|---|---|
| 5,794,151 A | * | 8/1998 | McDonald et al. | 455/454 |
| 6,714,789 B1 | * | 3/2004 | Oh et al. | 455/456.1 |
| 6,778,809 B2 | * | 8/2004 | Morimoto | 455/11.1 |
| 2005/0070276 A1 | | 3/2005 | McGarry | |
| 2005/0260973 A1 | | 11/2005 | van de Groenendaal | |

* cited by examiner

*Primary Examiner*—Huy Phan
*Assistant Examiner*—Shantell Heiber
(74) *Attorney, Agent, or Firm*—Kramer & Amado, P.C.

(57) ABSTRACT

A system and method are provided for controlling access to a wireless network by a remote terminal in a restricted frequency band in accordance with authorization conditions defined by geographic location. The remote terminal has a geographic self locating capability from which a location specifier is generated. The location specifier is compared to a geographic zone map which has information pertaining to conditions for authorizing communications in the restricted frequency band for various different geographic zones. Depending upon which geographic zone the remote terminal is in or nearby, power level, and time period of communication vary.

32 Claims, 3 Drawing Sheets

RESTRICTED FREQUENCY BAND REMOTE DEVICE COMMUNICATION AUTHORIZATION BY GEOGRAPHIC LOCATION

FIELD OF THE INVENTION

The invention relates to wireless communications and in particular to controlling access to a wireless network by a remote wireless terminal in a restricted frequency band in accordance with authorization conditions defined by geographic location.

BACKGROUND OF THE INVENTION

Government regulation relating to spectrum use takes into account many priorities and objectives, balancing commercial interests with critical infrastructure or national security needs, examples of which include military radar, navigational radio beacons, and radio-location installations. To protect the frequency bands used for critical infrastructure and security purposes, spectrum use restrictions have been established to ensure that authorized devices and protected services associated with those devices are not disrupted. Governments also restrict use of radio-frequency devices in parts of their territory immediately adjacent to borders they share with other authorities, since roaming radio-frequency terminals may stray arbitrarily close to a border area, and from this location may transmit radio-frequency signals across the border which interfere with communications within the domain of, and under the control of another authority.

The ever expanding use of wireless communications is demanding more intensive utilization of RF spectrum resources in border areas, and within frequency bands where pre-existing protected radio-frequency installations have typically enjoyed exclusive use. Restricting all commercial communications in restricted frequency bands in many cases is inefficient and unnecessary since only transmissions within a certain geographic range and above a certain power threshold would threaten the authorized devices and the protected services.

SUMMARY OF THE INVENTION

According to one broad aspect the invention provides for a method of wireless remote terminal communication within a restricted frequency band, the method comprising: geolocating, at the remote terminal, the remote terminal to generate a location specifier corresponding to a geographic location of the remote terminal; comparing said location specifier with remote terminal authorization information to determine authorization communication conditions for said remote terminal at said geographic location to communicate in the restricted frequency band; and authorizing communications of said remote terminal in the restricted frequency band in accordance with said authorization communication conditions.

In some embodiments of the invention said remote terminal authorization information comprises a geographic communication zone map, said geographic communication zone map containing information defining at least one geographic zone, wherein corresponding authorization communication conditions are defined for each geographic zone, and wherein said comparing comprises: analyzing a position corresponding to said location specifier on said geographic communication zone map to determine in which geographic zone of said at least one geographic zone, said geographic location corresponding to said location specifier is situated.

In some embodiments of the invention said at least one geographic zone comprises at least one protected zone, the authorization communication conditions corresponding to said at least one protected zone specifying that said remote terminal is authorized to communicate within said restricted frequency band at a first power level below a protected zone power threshold.

In some embodiments of the invention said at least one geographic zone comprises at least one intermediate zone, the authorization communication conditions corresponding to said at least one intermediate zone specifying that said remote terminal is authorized to communicate within said restricted frequency band for a period of time less than a re-authorization timeout period determined by analyzing a distance between said geographic location defined by said location specifier, and said at least one protected zone.

According to another broad aspect the invention provides for a remote terminal for wireless communication with a base station within a restricted frequency band, the remote terminal comprising: a geographic auto-location module for generating a location specifier corresponding to a geographic location of the remote terminal; a memory store for storing said location specifier, and for storing remote terminal authorization information; a geographic comparator for comparing said location specifier with said remote terminal authorization information and to determine authorization communication conditions for said remote terminal at said geographic location to communicate in the restricted frequency band; an authorization control module for authorizing with use of said authorization communication conditions, communications of said remote terminal in the restricted frequency band in accordance with said authorization communication conditions; and a transmitter controller for controlling communications with said base station in said restricted frequency band according to said authorization communication conditions.

In some embodiments of the invention the geographic auto-location module is adapted to perform geographic auto-location using one of GPS, GLONASS, Galileo, and triangulation in cooperation with a plurality of participating triangulation base stations.

In some embodiments of the invention said remote terminal authorization information comprises a geographic communication zone map, said geographic communication zone map containing information defining at least one geographic zone, wherein corresponding authorization communication conditions are defined for each geographic zone, and wherein said geographic comparator in performing said comparing, analyzes a position corresponding to said location specifier on said geographic communication zone map to determine in which geographic zone of said at least one geographic zone, said geographic location corresponding to said location specifier is situated.

In some embodiments of the invention said at least one geographic zone comprises at least one intermediate zone, the authorization communication conditions corresponding to said at least one intermediate zone specifying that said remote terminal is authorized to communicate within said restricted frequency band for a period of time less than a re-authorization timeout period.

In some embodiments of the invention said at least one geographic zone comprises at least one protected zone, the authorization communication conditions corresponding to said at least one protected zone specifying that said remote terminal is authorized to communicate within said restricted frequency band at a first power level below a protected zone power threshold.

In some embodiments of the invention said remote terminal is fixed to a vehicle having a known direction of movement, said remote terminal having a known relative orientation to said movement of said vehicle, and having a directional antenna, wherein the authorization communication conditions corresponding to each geographic zone specifies directions for transmitting at a low power level within the restricted frequency band and other directions for transmitting at a normal power level.

In some embodiments of the invention said at least one geographic zone comprises at least one intermediate zone, the authorization communication conditions corresponding to said at least one intermediate zone specifying that said remote terminal is authorized to communicate within said restricted frequency band for a period of time less than a re-authorization timeout period determined from a distance between said geographic location defined by said location specifier, and said at least one protected zone.

In some embodiments of the invention the authorization communication conditions corresponding to said at least one intermediate zone specifies that said remote terminal is authorized to communicate in said at least one intermediate zone within said restricted frequency band at a second power level below an intermediate zone power threshold determined with use of said distance.

In some embodiments of the invention said re-authorization timeout period is determined from dividing a smallest distance between said geographic location and said at least one protected zone by a maximum expected speed of said remote terminal.

In some embodiments of the invention said maximum expected speed is a maximum speed expected to be attained by a vehicle said remote terminal is traveling with.

In some embodiments of the invention a master zone map is stored in a memory store of said base station, wherein said remote terminal is adapted to transmit said location specifier and an authorization version specifier to said base station, wherein the authorization version specifier specifies a version of said geographic communication zone map; and wherein said remote terminal synchronizes its geographic communication zone map with said master zone map with use of said authorization version specifier.

According to yet another broad aspect, the invention provides for a base station for wireless communication with a remote terminal within a restricted frequency band, the base station comprising: a receiver for receiving a location specifier from said remote terminal, said location specifier corresponding to a geographic location of said remote terminal; a memory store for storing authorization information used in determining authorization communication conditions for said remote terminal at said geographic location to communicate in the restricted frequency band; a geographic comparator for comparing said location specifier with said authorization information; and a transmitter for transmitting to said remote terminal an authorization message.

In some embodiments of the invention said authorization information comprises a master zone map, said master zone map containing information defining at least one geographic zone, wherein corresponding authorization communication conditions are defined for each geographic zone, and wherein said geographic comparator is adapted to, while comparing said location specifier with said authorization information, analyze a position corresponding to said location specifier on said master zone map to determine in which geographic zone of said at least one geographic zone, said geographic location corresponding to said location specifier is situated.

In some embodiments of the invention said at least one geographic zone comprises at least one intermediate zone, the authorization communication conditions corresponding to said at least one intermediate zone specifying that said remote terminal is authorized to communicate with said base station within said restricted frequency band for a period of time less than a re-authorization timeout period.

In some embodiments of the invention said at least one geographic zone comprises at least one protected zone, the authorization communication conditions corresponding to said at least one protected zone specifying that said remote terminal is authorized to communicate with said base station within said restricted frequency band at a first power level below a protected zone power threshold.

In some embodiments of the invention said at least one geographic zone comprises at least one intermediate zone, the authorization communication conditions corresponding to said at least one intermediate zone specifying that said remote terminal is authorized to communicate with said base station within said restricted frequency band for a period of time less than a re-authorization timeout period determined by analyzing a distance between said geographic location defined by said location specifier, and said at least one protected zone.

In some embodiments of the invention the authorization communication conditions corresponding to said at least one intermediate zone specifies that said remote terminal is authorized to communicate in said at least one intermediate zone with said base station within said restricted frequency band at a second power level below an intermediate zone power threshold determined with use of said distance.

In some embodiments of the invention said re-authorization timeout period is determined by finding a smallest distance between said geographic location and said at least one protected zone and by dividing said smallest distance by a maximum expected speed of said remote terminal.

Some embodiments of the invention further provide for an authorization module for populating said authorization message with authorization communication conditions determined from a determination by said geographic comparator of which geographic zone of said at least one geographic zone, said geographic location corresponding to said location specifier is situated in, said authorization message being cryptographically encrypted.

In some embodiments of the invention said authorization message is generated with use of information pertaining to one of an emergency situation and an exceptional circumstance.

In some embodiments of the invention said geographic comparator compares said location specifier with said authorization information to generate a geographic communication zone map from said master zone map, and wherein said base station populates said authorization message with said geographic communication zone map.

In some embodiments of the invention said base station is located outside of said at least one protected zone, and wherein said base station initiates communications with said remote terminal.

In some embodiments of the invention a geographic communication zone map is stored in a memory store of said remote terminal, wherein an authorization version specifier is received by the base station from said remote terminal, said authorization version specifier specifying a version of said geographic communication zone map; and wherein said geographic communication zone map is synchronized with said master zone map with use of said authorization version specifier.

According to a further broad aspect the invention provides for a method of wireless communication with a remote terminal within a restricted frequency band, the method comprising: receiving a location specifier from said remote terminal, said location specifier corresponding to a geographic location of said remote terminal; maintaining authorization information used in determining authorization communication conditions for said remote terminal at said geographic location to communicate in the restricted frequency band; comparing said location specifier with said authorization information; and transmitting to said remote terminal an authorization message.

In some embodiments of the invention said authorization information comprises a master zone map, said master zone map containing information defining at least one geographic zone, wherein corresponding authorization communication conditions are defined for each geographic zone, and wherein said comparing said location specifier with said authorization information comprises analyzing a position corresponding to said location specifier on said master zone map to determine in which geographic zone of said at least one geographic zone, said geographic location corresponding to said location specifier is situated.

In some embodiments of the invention said at least one geographic zone comprises at least one intermediate zone, the authorization communication conditions corresponding to said at least one intermediate zone specifying that said remote terminal is authorized to communicate within said restricted frequency band for a period of time less than a re-authorization timeout period.

In some embodiments of the invention said at least one geographic zone comprises at least one protected zone, the authorization communication conditions corresponding to said at least one protected zone specifying that said remote terminal is authorized to communicate within said restricted frequency band at a first power level below a protected zone power threshold.

In some embodiments of the invention said at least one geographic zone comprises at least one intermediate zone, the authorization communication conditions corresponding to said at least one intermediate zone specifying that said remote terminal is authorized to communicate within said restricted frequency band for a period of time less than a re-authorization timeout period determined by analyzing a distance between said geographic location defined by said location specifier, and said at least one protected zone.

In some embodiments of the invention the authorization communication conditions corresponding to said at least one intermediate zone specifies that said remote terminal is authorized to communicate in said at least one intermediate zone within said restricted frequency band at a second power level below an intermediate zone power threshold determined with use of said distance.

In some embodiments of the invention said re-authorization timeout period is determined by finding a smallest distance between said geographic location and said at least one protected zone and by dividing said smallest distance by a maximum expected speed of said remote terminal.

Some embodiments of the invention further provide for populating said authorization message with authorization communication conditions determined from said comparing of said location specifier with said authorization information, said authorization message being cryptographically encrypted.

In some embodiments of the invention said authorization message is generated with use of information pertaining to one of an emergency situation and an exceptional circumstance.

Some embodiments of the invention further provide for: generating a geographic communication zone map from said master zone map with use of a comparison generated by said comparing of said location specifier with said authorization information; and populating said authorization message with said geographic communication zone map.

Some embodiments of the invention further provide for before the step of receiving, initiating communications to said remote terminal from a location outside of said at least one protected zone.

Some embodiments of the invention further provide for: receiving an authorization version specifier from said remote terminal, said authorization version specifier specifying a version of a geographic communication zone map in a memory store of said remote terminal; and synchronizing said geographic communication zone map with said master zone map with use of said authorization version specifier.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

A method and system for controlling access to a wireless network by a remote wireless terminal in a restricted frequency band in accordance with authorization conditions defined by geographic location according to the preferred embodiments are now described with reference to FIGS. 1, 2, and 3.

Figure 1:
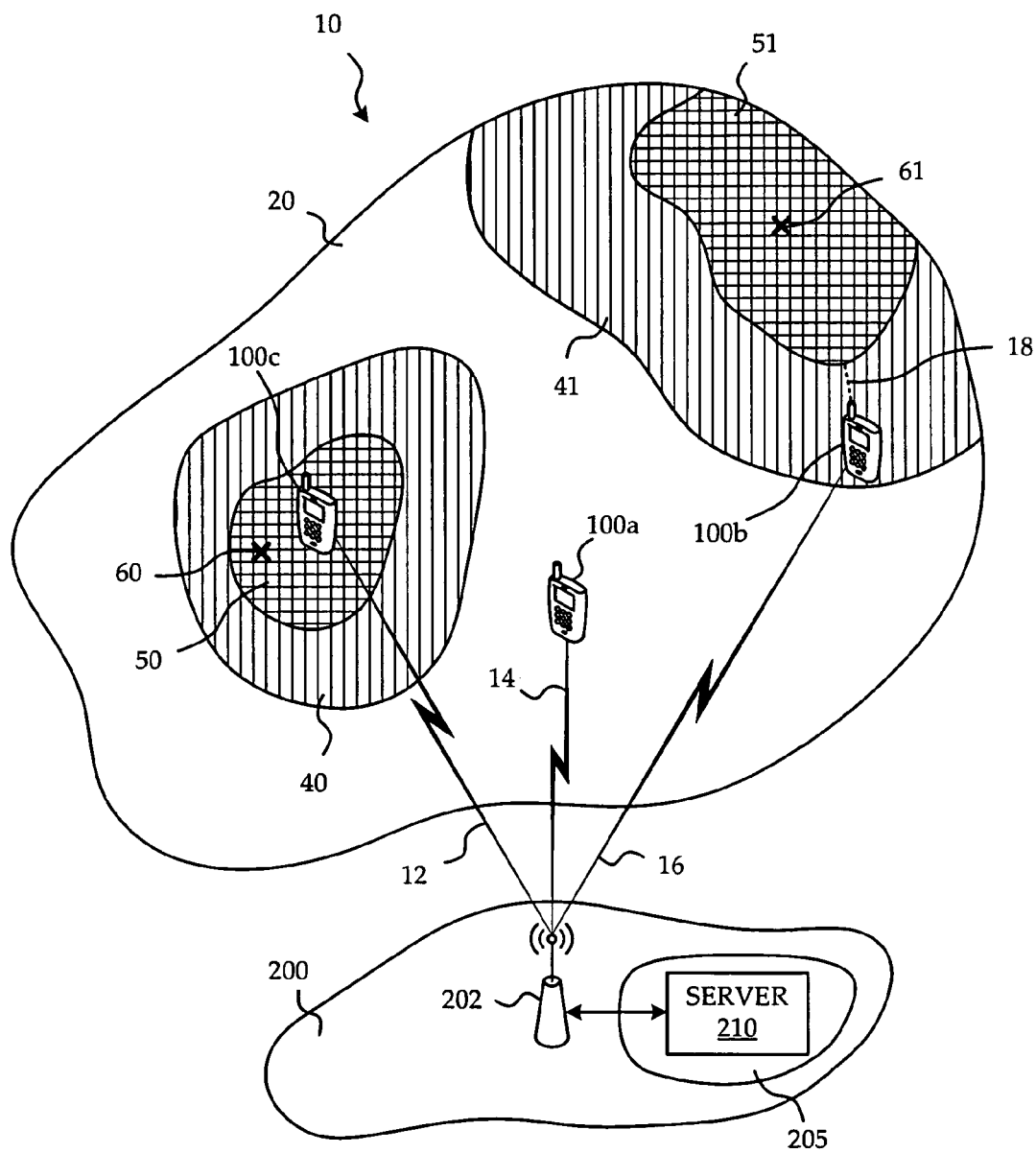
FIG. 1 is a schematic diagram illustrating a geographic context in which the preferred embodiment of the invention may operate.
Figure 2:
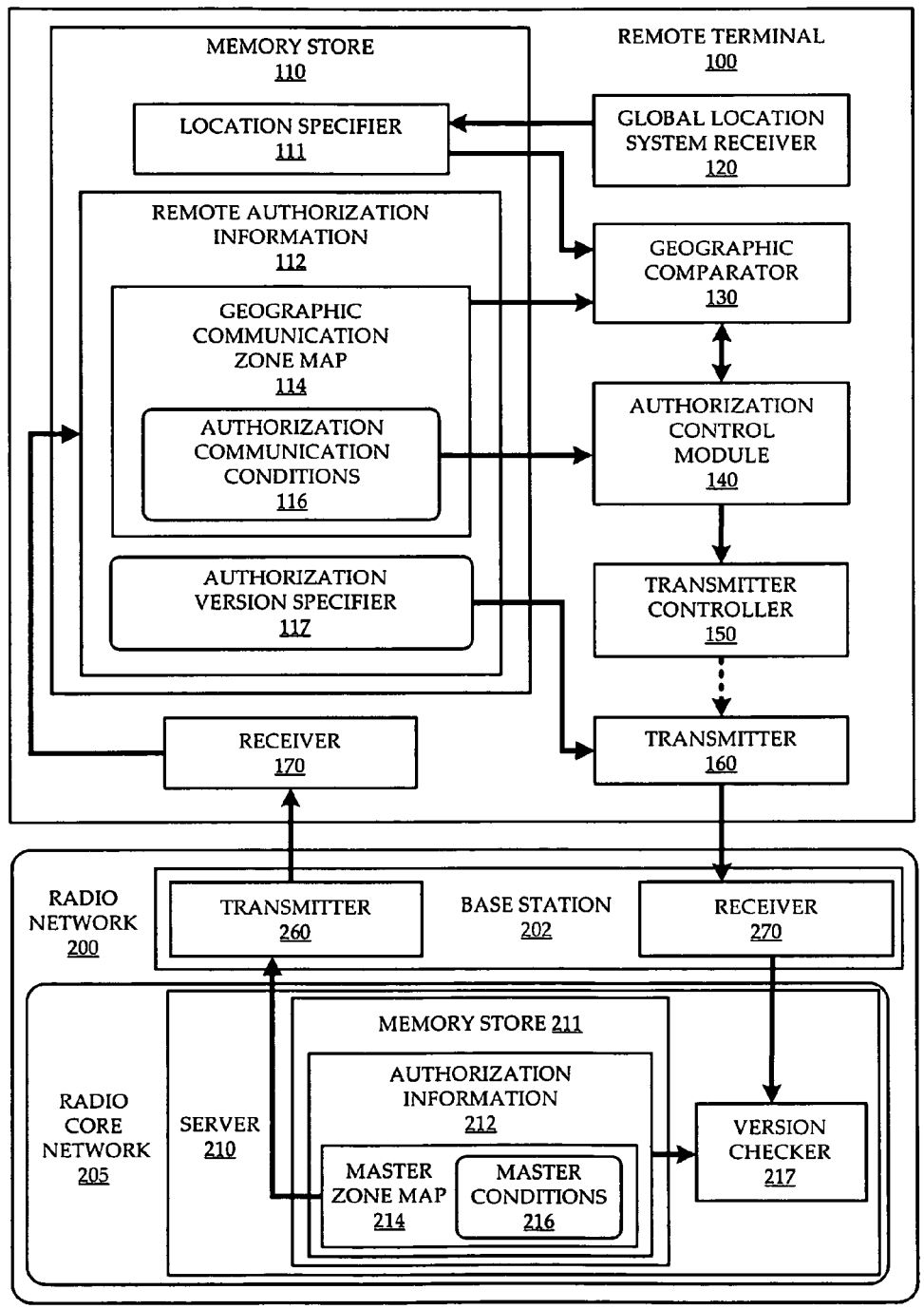
FIG. 2 is a schematic block diagram of a system according to the preferred embodiment of the invention.

FIG. 2, illustrates a system according to the preferred embodiment of the invention which includes a remote terminal 100 and a base station 202 of a radio network 200 with which the remote terminal 100 seeks to communicate wirelessly, within a geographic context such as that illustrated in FIG. 1 using a restricted frequency band which is described in more detail below. The geographic context in which the preferred embodiment of the invention may operate is one in which the remote terminal 100 is freely roaming in geographic zones within a known geographic area 10. The remote terminal 100 is shown in three different geographic locations and is accordingly labeled 100*a* at a first geographic location, labeled 100*b* at a second geographic location, and is labeled 100*c* at a third geographic location.

Referring to FIG. 2, the system including the remote terminal 100 and the base station 202 will now be discussed in terms of structure.

The remote terminal 100 has a memory store 110. The memory store 110 of the remote terminal 100 while in operation in a geographic context such as the one depicted in FIG. 1 has a location specifier 111 which corresponds to an actual geographic location of the remote terminal 100. The memory store 110 of the remote terminal 100 also has remote terminal authorization information 112 which includes a geographic communication zone map 114, and an authorization version specifier 117. The authorization version specifier 117 serves to specify a version of the remote terminal authorization information 112. The geographic communication zone map 114 includes geographic data delineating different geographic zones of the geographic area 10. The geographic zones include protected zones, intermediate zones, and safe zones which are described further below. The geographic communication zone map 114 also includes authorization communication conditions 116 which define the conditions for communicating within the zones of the geographic communication zone map 114 in the restricted frequency band.

The remote terminal 100 has a geographic auto-location module which in the preferred embodiment is a global location system receiver 120 examples of which are GPS, GLONASS, and Galileo. In some embodiments the geographic auto-location module is a geographic triangulation module or a module capable of road or track-side location beacon sensing. A geographic comparator 130 of the remote terminal 100 has access to the location specifier 111, and the geographic communication zone map 114 of the remote terminal authorization information 112 of the memory store 110. An authorization control module 140 is coupled to the geographic comparator 130, and has access to the authorization communication conditions 116. The authorization control module 140 is coupled to a transmitter controller 150 which is coupled to a transmitter 160. The authorization version specifier 117 of the remote terminal authorization information 112 is accessible to the transmitter 160 for transmission to the base station 202 of the radio network 200. The remote terminal authorization information 112 is accessible to a receiver 170 for updating with information received from the base station 202.

The radio network 200 has a radio core network 205 in which there is a master information server 210 which has a memory store 211 and a version checker 217. In some embodiments the radio core network 205 and its associated information server 210 and memory store 211 may be embedded within one or more base stations such as base station 202. The memory store 211 of the master information server 210 includes authorization information 212 which includes a master zone map 214. The authorization information 212 contains information regarding the authorization of the remote terminal 100 to communicate in the restricted frequency band in various zones within a large area delineated by the master zone map 214. The master information server 210 of the radio core network 205 is aware of the fixed geographic location of each base station of the radio network 200, and is able to preferentially send only those elements of the master zone map 214 immediately adjacent to the known location of the base station 202 which is in communication with the remote terminal 100 requesting or requiring update of it's geographic communication zone map 114. This information can include metadata, such as a version number or date of creation for the master zone map 214. The master zone map 214 is an authoritative, relatively current, large area, geographic zone map which includes geographic data delineating different geographic zones of an area at least as large as the geographic area 10 for which the remote terminal 100 has the geographic communication zone map 114. The geographic zones of the master zone map 214 include protected zones, intermediate zones, and safe zones. The master zone map 214 has an authoritative and current set of authorization communication conditions referred to as master conditions 216 for the large geographic area it covers.

The master zone map 214 is accessible to a transmitter 260 of the base station 202 for transmission to the remote terminal 100. The version checker 217 is linked to a receiver 270 of the base station 202 for receiving the authorization version specifier 117 from the remote terminal 100. The version checker 217 is also linked to the authorization information 212 of the memory store 211 of the master information server 210.

Figure 3:
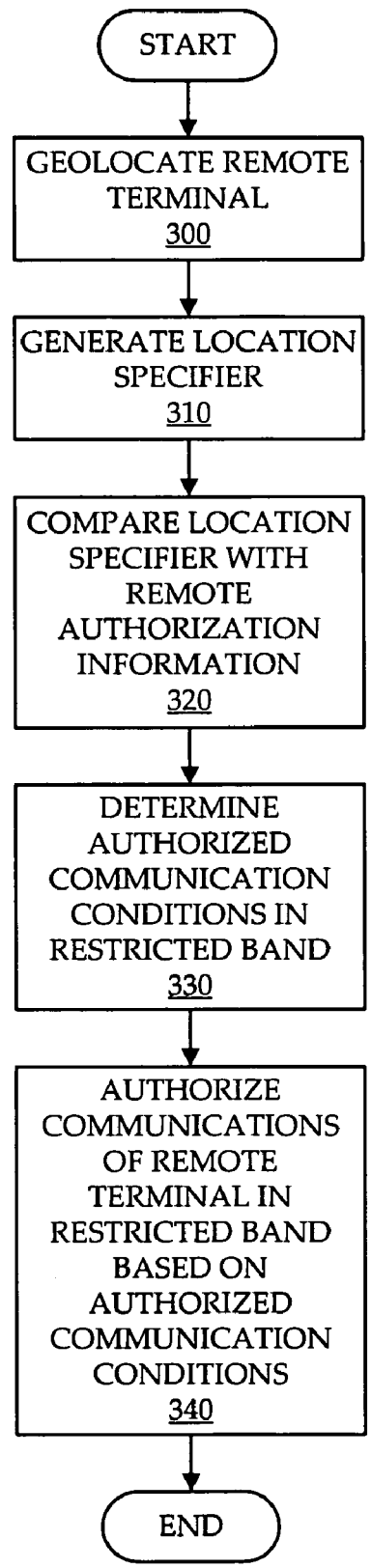
FIG. 3 is a functional block diagram illustrating steps in a method according to the preferred embodiment of the invention.

With reference to FIGS. 1 and 2, operation of the system of FIG. 2 and a preferred method according to the invention as shown in FIG. 3 are discussed.

Protected radio-frequency devices 60, 61 using the restricted frequency band and participating in services over that restricted frequency band are indicated by an "X". In the particular geographic area 10 shown, these protected radio-frequency devices 60, 61 have fixed locations and operate within protected zones 50, 51. These protected radio-frequency devices 60, 61 could be for example radar, or communications equipment used by an airport or a military installation. One example pre-existing restricted frequency band is the FWA 3475 MHz-3650 MHz band in Canada, for which use of remote terminals for commercial communications is not authorized.

As discussed above, the remote terminal 100 has self-locating or geographic auto-location technology. In a first step of a method according to the preferred embodiment illustrated in FIG. 3, the remote terminal 100 determines its own geographic location at step 300. In the preferred embodiment the geographic location is obtained from a geographic auto-location capability of the remote terminal 100 such as the global location system receiver 120, while in other embodiments the remote terminal 100 cooperates with a plurality of triangulation base stations (not shown) which determine and inform the remote terminal 100 of its geographic location through radio triangulation. Radio triangulation would involve transmitting signals from the remote terminal 100 to the plurality of triangulation base stations, computing in the radio network 200 a geographic location of the remote terminal 100 with use of the signals transmitted from the remote terminal to the plurality of triangulation base stations, and finally relaying of the geographic location back to the remote terminal. Once the geographic location of the remote terminal 100 has been determined, the location specifier 111 corresponding to the geographic location is generated in step 310 and stored by the remote terminal 100 in its memory store 110.

In an exemplary embodiment, preliminary communications between the remote terminal and the base station are commenced by use of a frequency band outside of the restricted frequency band or by use of chirping, the use of short communication bursts, within the restricted frequency band. In the exemplary embodiment, the preliminary communications are used to ensure that the remote terminal 100 is in possession of the most current remote terminal authorization information 112 including the most current geographic communication zone map 114, and any emergency or exceptional status information of the network which is needed to restrict the communications of the remote terminal 100 at that particular time and place.

The preliminary communications involve transmission of the authorization version specifier 117 by the remote terminal 100 through transmitter 160. The base station 202 receives the authorization version specifier 117 over its receiver 270 which forwards the authorization version specifier 117 to the version checker 217 of the master information server 210 in the radio core network 205. The version checker 217 compares the authorization version specifier 117 with the authorization information 212 of the memory store 211 of the master information server 210. In the case where a comparison of the authorization version specifier 117 and the authorization information 212 indicates that the remote terminal 100 has the most current remote terminal authorization information 112, an acknowledgement confirming this is sent over the transmitter 260 of the base station 202 to the remote terminal 100. In the case where a comparison of the authorization version specifier 117 and the authorization information 212 indicate that the remote terminal 100 does not have the most current remote terminal authorization information 112, the master information server 210 generates a zone map update for the remote terminal authorization information 112 with use of the authorization information 212 and the master zone map 214, and transmits it over the transmitter 260 of the base station 202 to the remote terminal 100. Upon receiving at the receiver 170 the zone map update, the remote terminal 100 updates the remote terminal authorization information 112 with it. In some cases this update is a replacement of the entire remote terminal authorization information 112 or just the geographic communication zone map 114, while in other cases it is partial replacement of the remote terminal authorization information 112 or the geographic communication zone map 114, and in still other cases the update is in the form of an information delta to be applied to the remote terminal authorization information 112 or the geographic communication zone map 114.

The remote terminal compares in step 320 the location specifier 111 with the remote terminal authorization information 112 which includes the geographic communication zone map 114 showing the protected zones 50, 51 and intermediate zones 40, 41. In the preferred embodiment the geographic comparator 130 performs the step of comparing 320. In an exemplary embodiment a position, compatible with the coordinate system of the geographic communication zone map 114 is generated from the location specifier 111. This position is then analyzed on the geographic communication zone map 114 to determine which geographic zone the actual remote terminal 100 is in.

The remote terminal 100 may determine it is outside of all protected 50, 51 and intermediate 40, 41 zones and is in a safe zone 20, by comparing the location specifier 111 with the geographic communication zone map 114 of the remote terminal authorization information 112. When the remote terminal 100*a* is roaming outside of all protected zones 50, 51 and intermediate zones 40, 41, in a safe zone 20, the remote terminal 100*a* is permitted to communicate using the restricted frequency band at normal power since it is not within a range which may cause interference with or any disruption of existing services for the protected radio-frequency devices 60, 61 within the restricted frequency band.

At step 330 the remote terminal 100*a* determines these authorization communication conditions for communicating in the restricted frequency band with use of the geographic zone determined by the geographic comparator 130 and the authorization communication conditions 116 associated with the safe zone 20 retrieved by the authorization control module 140.

To perform the step of authorizing communications 340, the authorization control module 140 authorizes normal power and use of the restricted frequency band for communications, by setting the transmitter controller 150 accordingly. The transmitter controller 140 controls the transmitter 160 to transmit according to the conditions set.

The remote terminal 100 may determine it is within an intermediate zone 40, 41 by comparing the location specifier 111 with the geographic communication zone map 114 of the remote terminal authorization information 112. Within each intermediate zone 40, 41 the remote terminal 100*b* is subject to certain authorization conditions for communication within the restricted frequency band. Depending upon the authorization conditions for the specific intermediate zone 40, 41 a remote terminal 100*b* may be required to communicate below a certain power threshold. This power threshold of an intermediate zone 40, 41 is referred to as an intermediate zone power threshold. Alternatively or in conjunction, the remote terminal 100*b* may also be constrained to use the restricted frequency band only for a set re-authorization timeout period. The re-authorization timeout period may be calculated based upon a distance 18 between the remote terminal 100*b* and the closest protected zone 51. Such a time period could be set for a remote terminal 100*b* traveling in a vehicle traveling at a speed such that the remote terminal 100*b* could not stray into the protected zone 51 before expiry of that time period. In one exemplary embodiment, the time period is set to a value less than a maximum expected speed of the vehicle divided by the distance 18 between the remote terminal 100*b* and the protected zone 51. The maximum expected speed may be preferably set to a maximum expected speed of a terrestrial motor vehicle which may in a particular embodiment be taken to be 250 km/h.

As described above, the remote terminal 100*b* determines these authorization communication conditions for communicating in the restricted frequency band at step 330 with use of the intermediate zone 41 determined by the geographic comparator 130 and the authorization communication conditions 116 associated with the intermediate zone 41 retrieved by the authorization control module 140.

To perform the step of authorizing communications 340, the authorization control module 140 authorizes communication below a certain power threshold and use of the restricted frequency band for communications for a set re-authorization timeout period, by setting the transmitter controller 150 accordingly. The transmitter controller 140 controls the transmitter 160 to transmit according to the conditions and for as long as they allow.

The remote terminal 100 may determine it is within the protected zone 50 as a result of the comparison of the location specifier 111 with the geographic communication zone map 114 of the remote terminal authorization information 112. Within the protected zone 50, the remote terminal 100*c* is authorized to communicate below a protected zone power threshold which is set to an insignificant power level within the restricted frequency band. This protected zone power threshold could still be effective for communicating at very short range on the order of a meter with, for example, a personal computer. Additionally the authorization communication conditions 116 may allow communications in an alternative frequency band chosen for that specific communications request.

In some embodiments, the remote terminal initiates communication with the base station in a frequency band other than the restricted frequency band, and does not use the restricted frequency band unless and until the remote terminal is subsequently authorized to do so. In some embodiments, the remote terminal initiates communication with the base station using chirping within the restricted frequency band. Initiating communications in a manner which causes minimal interference in the restricted frequency band allows preliminary communications to be independent of the actual authorization communication conditions for communicating at the geographic location within the restricted frequency band.

In some embodiments the radio network 200 sends out un-solicited frequent periodic updates of the master zone map 214, with the base station 202 receiving and then broadcasting a sub-set of the master zone map 214 pertaining to its primary geographic coverage area. The remote terminal 100 when it is within the serving area of the base station 202 will therefore receive appropriate information to update its memory store 110.

In some embodiments, geographic information in the master zone map 214 may be represented as simple polygons or circles with a few absolute geolocation tags, thereby minimizing the volume of data that must be passed between the radio network 200 and the remote terminal 100. In this embodiment, the remote terminal 100 can determine where it is located within the restricted polygon or circle and take appropriate action.

In some embodiments the remote terminal 100 does not possess any remote terminal authorization information 112 or any geographic communication zone map 114. In these embodiments the remote terminal 100 transmits, after determining its geographic location, the location specifier 111 to the base station 202. The base station 202 then performs the step of comparing 320 the location specifier 111 with the authorization information 212 serving as the remote terminal authorization information 112 of other embodiments. The base station 202 performs the steps of determining the authorization communications conditions and authorizes the communications of the remote terminal 100 in the restricted band by transmitting them to the remote terminal 100. The remote terminal 100 then sets the transmitter controller 150 in accordance with the authorized communications conditions.

In some embodiments the base station 202 and the radio core network 205 use encrypted communication over the air link, in conjunction with verification of the remote terminals 100 identity through the use of unique identifiers. These techniques are well known in the art, and are widely used within current generation mobile systems. In GSM mobility networks, for example, strong encryption and authentication are provided and remote terminals use SIM smart cards with unique encrypted identity codes to establish their authenticity. Re-use of and reliance upon these security techniques prevents spoofing of the radio network 200 for malicious purposes, which could otherwise be achieved by the sending of invalid remote authorization information to the remote terminal 100.

In some embodiments the remote terminal 100 is affixed to a vehicle, and has a known orientation in relation thereto and particularly has a known orientation in relation to a direction of movement of the vehicle. Such would be the case for example of the remote terminal 100 being fixedly mounted on a train or transport truck. With use of the location specifier, and the known orientation and direction of movement of the vehicle (which may for example be calculated by observing change in geographic location over time), the remote terminal may advantageously use a directional antenna in conjunction with the geographic communication zone map. The directional antenna would allow broadcast of much higher power in certain directions (towards a base station for example) while creating much lower power in directions which lead to protected zones or authorized devices.

The embodiments presented are exemplary only and persons skilled in the art would appreciate that variations to the embodiments described above may be made without departing from the spirit of the invention. The scope of the invention is solely defined by the appended claims.

I claim:

1. A method of wireless remote terminal communication within a restricted frequency band, the method comprising:

geolocating, at the remote terminal, the remote terminal to generate a location specifier corresponding to a geographic location of the remote terminal;

comparing said location specifier with remote terminal authorization information to determine authorization communication conditions for said remote terminal at said geographic location to communicate in the restricted frequency band, wherein said remote terminal authorization information comprises a geographic communication zone map, said geographic communication zone map containing information defining at least one geographic zone, wherein said at least one geographic zone comprises at least one intermediate zone, the step of comparing comprising:

analyzing a position corresponding to said location specifier on said geographic communication zone map to determine in which geographic zone of said at least one geographic zone said geographic location corresponding to said location specifier is situated; and authorizing communications of said remote terminal in the restricted frequency band in accordance with said authorization communication conditions, wherein said authorization communication conditions are defined for each geographic zone, said authorization communication conditions corresponding to said at least one intermediate zone specifying that said remote terminal is authorized to communicate within said restricted frequency band for a period of time less than a re-authorization timeout period.

2. A method according to claim 1 wherein said at least one geographic zone further comprises at least one protected zone, the authorization communication conditions corresponding to said at least one protected zone specifying that said remote terminal is authorized to communicate within said restricted frequency band at a first power level below a protected zone power threshold.

3. The method of claim 2, wherein said period of time less than a re-authorization timeout period is determined from a distance between said geographic location defined by said location specifier and said at least one protected zone.

4. A remote terminal for wireless communication with a base station within a restricted frequency band, the remote terminal comprising:

a geographic auto-location module for generating a location specifier corresponding to a geographic location of the remote terminal;

a memory store for storing said location specifier, and for storing remote terminal authorization information, wherein said remote terminal authorization information comprises a geographic communication zone map, said geographic communication zone map containing information defining at least one geographic zone;

a geographic comparator for comparing said location specifier with said remote terminal authorization information and to determine authorization communication conditions for said remote terminal at said geographic location to communicate in the restricted frequency band, wherein said authorization communication conditions are defined for each geographic zone, and said geographic comparator in performing said comparing, analyzes a position corresponding to said location specifier on said geographic communication zone map to determine in which geographic zone of said at least one geographic zone said geographic location corresponding to said location specifier is situated;
an authorization control module for authorizing communications of said remote terminal in the restricted frequency band in accordance with said authorization communication conditions; and
a transmitter controller for controlling communications with said base station in said restricted frequency band according to said authorization communication conditions,
wherein said at least one geographic zone comprises at least one intermediate zone, the authorization communication conditions corresponding to said at least one intermediate zone specifying that said remote terminal is authorized to communicate within said restricted frequency band for a period of time less than a re-authorization timeout period.

5. A remote terminal according to claim 4 wherein the geographic auto-location module is adapted to perform geographic auto-location using one of GPS, GLONASS, Galileo, and triangulation in cooperation with a plurality of participating triangulation base stations.

6. A remote terminal according to claim 4 wherein said at least one geographic zone further comprises at least one protected zone, the authorization communication conditions corresponding to said at least one protected zone specifying that said remote terminal is authorized to communicate within said restricted frequency band at a first power level below a protected zone power threshold.

7. A remote terminal according to claim 6 wherein said remote terminal is fixed to a vehicle having a known direction of movement, said remote terminal having a known relative orientation to said movement of said vehicle, and having a directional antenna, wherein the authorization communication conditions corresponding to each geographic zone specify directions for transmitting at a low power level within the restricted frequency band and other directions for transmitting at a normal power level.

8. A remote terminal according to claim 6 wherein said period of time less than a re-authorization timeout period is determined from a distance between said geographic location defined by said location specifier, and said at least one protected zone.

9. A remote terminal according to claim 8 wherein the authorization communication conditions corresponding to said at least one intermediate zone specify that said remote terminal is authorized to communicate in said at least one intermediate zone within said restricted frequency band at a second power level below an intermediate zone power threshold determined with use of said distance.

10. A remote terminal according to claim 8 wherein said re-authorization timeout period is determined from dividing a smallest distance between said geographic location and said at least one protected zone by a maximum expected speed of said remote terminal.

11. A remote terminal according to claim 10 wherein said maximum expected speed is a maximum speed expected to be attained by a vehicle said remote terminal is traveling with.

12. A remote terminal according to claim 4 wherein a master zone map is stored in the memory store of said base station, wherein said remote terminal is adapted to transmit said location specifier and an authorization version specifier to said base station, wherein the authorization version specifier specifies a version of said geographic communication zone map; and wherein said remote terminal synchronizes its geographic communication zone map with said master zone map with use of said authorization version specifier.

13. A base station for wireless communication with a remote terminal within a restricted frequency band, the base station comprising:
a receiver for receiving a location specifier from said remote terminal, said location specifier corresponding to a geographic location of said remote terminal;
a memory store for storing authorization information used in determining authorization communication conditions for said remote terminal at said geographic location to communicate in the restricted frequency band, wherein:
said authorization information comprises a master zone map, said master zone map containing information defining at least one geographic zone,
said corresponding authorization communication conditions are defined for each geographic zone, and
said at least one geographic zone comprises at least one intermediate zone, the authorization communication conditions corresponding to said at least one intermediate zone specifying that said remote terminal is authorized to communicate with said base station within said restricted frequency band for a period of time less than a re-authorization timeout period;
a geographic comparator for comparing said location specifier with said authorization information, wherein said geographic comparator is adapted to, while comparing said location specifier with said authorization information, analyze a position corresponding to said location specifier on said master zone map to determine in which geographic zone of said at least one geographic zone said geographic location corresponding to said location specifier is situated; and
a transmitter for transmitting to said remote terminal an authorization message.

14. A base station according to claim 13 wherein said at least one geographic zone further comprises at least one protected zone, the authorization communication conditions corresponding to said at least one protected zone specifying that said remote terminal is authorized to communicate with said base station within said restricted frequency band at a first power level below a protected zone power threshold.

15. A base station according to claim 14 wherein said period of time less than said re-authorization timeout period is determined by analyzing a distance between said geographic location defined by said location specifier, and said at least one protected zone.

16. A base station according to claim 15 wherein the authorization communication conditions corresponding to said at least one intermediate zone specifies that said remote terminal is authorized to communicate in said at least one intermediate zone with said base station within said restricted frequency band at a second power level below an intermediate zone power threshold determined with use of said distance.

17. A base station according to claim 15 wherein said re-authorization timeout period is determined by finding a smallest distance between said geographic location and said at least one protected zone and by dividing said smallest distance by a maximum expected speed of said remote terminal.

18. A base station according to claim 14 wherein said base station is located outside of said at least one protected zone, and wherein said base station initiates communications with said remote terminal.

19. A base station according to claim 13, said base station further comprising:
an authorization module for populating said authorization message with authorization communication conditions determined from a determination by said geographic comparator of which geographic zone of said at least one geographic zone, said geographic location corresponding to said location specifier is situated in, said authorization message being cryptographically encrypted.

20. A base station according to claim 13 wherein said authorization message is generated with use of information pertaining to one of an emergency situation and an exceptional circumstance.

21. A base station according to claim 13 wherein said geographic comparator compares said location specifier with said authorization information to generate a geographic communication zone map from said master zone map, and wherein said base station populates said authorization message with said geographic communication zone map.

22. A base station according to claim 13 wherein:
a geographic communication zone map is stored in a memory store of said remote terminal,
an authorization version specifier is received by the base station from said remote terminal, said authorization version specifier specifying a version of said geographic communication zone map, and
said geographic communication zone map is synchronized with said master zone map with use of said authorization version specifier.

23. A method of wireless communication with a remote terminal within a restricted frequency band, the method comprising:
receiving a location specifier from said remote terminal, said location specifier corresponding to a geographic location of said remote terminal;
maintaining authorization information used in determining authorization communication conditions for said remote terminal at said geographic location to communicate in the restricted frequency band, wherein:
said authorization information comprises a master zone map, said master zone map containing information defining at least one geographic zone,
said authorization communication conditions are defined for each geographic zone, and
said at least one geographic zone comprises at least one intermediate zone, the authorization communication conditions corresponding to said at least one intermediate zone specifying that said remote terminal is authorized to communicate within said restricted frequency band for a period of time less than a re-authorization timeout period;
comparing said location specifier with said authorization information, wherein said comparing said location specifier with said authorization information comprises analyzing a position corresponding to said location specifier on said master zone map to determine in which geographic zone of said at least one geographic zone said geographic location corresponding to said location specifier is situated; and
transmitting to said remote terminal an authorization message.

24. A method according to claim 23 wherein said at least one geographic zone comprises at least one protected zone, the authorization communication conditions corresponding to said at least one protected zone specifying that said remote terminal is authorized to communicate within said restricted frequency band at a first power level below a protected zone power threshold.

25. A method according to claim 24 wherein said period of time less than a re-authorization timeout period is determined by analyzing a distance between said geographic location defined by said location specifier, and said at least one protected zone.

26. A method according to claim 25 wherein the authorization communication conditions corresponding to said at least one intermediate zone specifies that said remote terminal is authorized to communicate in said at least one intermediate zone within said restricted frequency band at a second power level below an intermediate zone power threshold determined with use of said distance.

27. A method according to claim 24 wherein said re-authorization timeout period is determined by finding a smallest distance between said geographic location and said at least one protected zone and by dividing said smallest distance by a maximum expected speed of said remote terminal.

28. A method according to claim 24 further comprises before the step of receiving, initiating communications to said remote terminal from a location outside of said at least one protected zone.

29. A method according to claim 23 further comprising populating said authorization message with authorization communication conditions determined from said comparing of said location specifier with said authorization information, said authorization message being cryptographically encrypted.

30. A method according to claim 23 wherein said authorization message is generated with use of information pertaining to one of an emergency situation and an exceptional circumstance.

31. A method according to claim 23 further comprising:
generating a geographic communication zone map from said master zone map with use of a comparison generated by said comparing of said location specifier with said authorization information; and
populating said authorization message with said geographic communication zone map.

32. A method according to claim 23 further comprising:
receiving an authorization version specifier from said remote terminal, said authorization version specifier specifying a version of a geographic communication zone map in a memory store of said remote terminal; and
synchronizing said geographic communication zone map with said master zone map with use of said authorization version specifier.

* * * * *